United States Patent
Meis et al.

(10) Patent No.: US 9,914,543 B2
(45) Date of Patent: Mar. 13, 2018

(54) SYSTEM AND METHOD FOR AIRCRAFT ICE DETECTION WITHIN A ZONE OF NON-DETECTION

(71) Applicants: Charles S. Meis, Renton, WA (US); Todd J. Germeroth, Woodinville, WA (US); David J. Lamb, Lynnwood, WA (US); Hosam E. El-Gabalawy, Bothell, WA (US)

(72) Inventors: Charles S. Meis, Renton, WA (US); Todd J. Germeroth, Woodinville, WA (US); David J. Lamb, Lynnwood, WA (US); Hosam E. El-Gabalawy, Bothell, WA (US)

(73) Assignee: The Boeing Company, Chicago, IL (US)

(*) Notice: Subject to any disclaimer, the term of this patent is extended or adjusted under 35 U.S.C. 154(b) by 194 days.

(21) Appl. No.: 14/964,365

(22) Filed: Dec. 9, 2015

(65) Prior Publication Data
US 2017/0166314 A1      Jun. 15, 2017

(51) Int. Cl.
*B64D 15/22* (2006.01)
*B64D 15/16* (2006.01)

(52) U.S. Cl.
CPC ......... *B64D 15/22* (2013.01); *B64D 15/166* (2013.01)

(58) Field of Classification Search
CPC ...... G01K 13/028; G01K 13/00; G01K 13/02; G01K 15/005; G01K 17/06; G01K 2213/00; G01K 3/00; G01N 25/72; G01N 25/18; G01N 25/66; G01N 2203/0694; G01N 25/005; G01N 27/223; B64D 15/20; B64D 2045/0085

USPC ... 374/100, 4, 5, 57, 45, 109, 110, 137, 112, 374/115
See application file for complete search history.

(56) References Cited

U.S. PATENT DOCUMENTS

| 3,768,310 | A | * | 10/1973 | Krepak | G01K 7/245 341/120 |
| 4,303,978 | A | * | 12/1981 | Shaw | G01C 21/16 244/177 |
| 4,355,760 | A | * | 10/1982 | Ruby | G05D 23/1928 165/219 |

(Continued)

FOREIGN PATENT DOCUMENTS

| CN | 101866525 B | | 1/2012 |
| CN | 104331136 A | * | 2/2015 |

(Continued)

OTHER PUBLICATIONS

Extended European Search Report, Application No. 16194503, dated May 22, 2017, 7 pages.

*Primary Examiner* — Gail Kaplan Verbitsky
(74) *Attorney, Agent, or Firm* — Toler Law Group, PC

(57) ABSTRACT

A method includes receiving a plurality of temperature measurements from temperature sensors of an aircraft. The method includes determining whether a first count of one or more first temperature metrics that are within a temperature range is greater than a first threshold. The one or more temperature metrics are derived from the plurality of temperature measurements. The method includes initiating generating an icing output signal when the first count is greater than or equal to the first threshold.

20 Claims, 6 Drawing Sheets

(56) References Cited

U.S. PATENT DOCUMENTS

| | | | | |
|---|---|---|---|---|
| 4,602,872 A * | 7/1986 | Emery | | G01K 3/02 310/53 |
| 4,788,398 A * | 11/1988 | Hornung | | F24C 15/106 219/448.12 |
| 4,980,673 A * | 12/1990 | Kleven | | G08B 19/02 244/134 F |
| 6,036,361 A * | 3/2000 | Gregory | | G01K 7/42 374/164 |
| 6,199,018 B1 * | 3/2001 | Quist | | G01M 13/028 318/806 |
| 7,015,826 B1 * | 3/2006 | Chan | | A01K 11/006 340/10.41 |
| 7,588,368 B2 * | 9/2009 | Hagen | | F02D 41/1445 374/135 |
| 8,265,805 B2 | 9/2012 | Ma et al. | | |
| 8,340,941 B2 * | 12/2012 | Jackson | | G01K 13/00 257/79 |
| 2004/0206854 A1 | 10/2004 | Shah et al. | | |
| 2005/0222556 A1 * | 10/2005 | Ariura | | A61B 18/20 606/12 |
| 2007/0239381 A1 * | 10/2007 | Ginggen | | A61M 5/14276 702/100 |
| 2008/0151964 A1 * | 6/2008 | Hagen | | F02D 41/1445 374/152 |
| 2009/0306928 A1 | 12/2009 | Battisti | | |
| 2011/0080207 A1 * | 4/2011 | Ball | | H01L 23/34 327/512 |
| 2013/0076381 A1 * | 3/2013 | Takayanagi | | G01K 3/005 324/750.03 |
| 2014/0166813 A1 | 6/2014 | Greene et al. | | |
| 2015/0034767 A1 * | 2/2015 | Pirat | | B64D 15/04 244/134 B |
| 2015/0117487 A1 * | 4/2015 | Feau | | G05B 23/0235 374/1 |
| 2015/0192476 A1 * | 7/2015 | Smith | | G01K 5/483 374/161 |
| 2015/0338315 A1 * | 11/2015 | Manahan | | G01M 99/008 702/183 |
| 2016/0101870 A1 * | 4/2016 | Leschi | | B64C 13/04 701/3 |
| 2016/0226416 A1 * | 8/2016 | Pham | | G01R 31/343 |
| 2016/0370236 A1 * | 12/2016 | Schwie | | G01K 13/028 |

FOREIGN PATENT DOCUMENTS

| | | | |
|---|---|---|---|
| CN | 205836644 U | * 12/2016 | |
| EP | 1839693 A1 | * 10/2007 | ........ A61M 5/14276 |
| EP | 2543597 A2 | 1/2013 | |

* cited by examiner

SYSTEM AND METHOD FOR AIRCRAFT ICE DETECTION WITHIN A ZONE OF NON-DETECTION

FIELD OF THE DISCLOSURE

The present disclosure relates to a system and method of detecting icing conditions for an aircraft.

BACKGROUND

Ice accumulation on critical surfaces of aircraft wings presents a threat in the field of aviation. Even a small amount of ice accumulation on a leading edge of an aircraft wing can have significant impacts on operating characteristics (e.g., lift and drag) of the aircraft. The real time detection of ice detection of aircraft icing is important to ensure a safe flight.

Existing ice detection sensors collect supercooled water droplets on the surface of the sensor. These ice detection sensors are designed to accumulate and detect ice accretion at the same time that the wing, engine inlet, or other leading edge surface accumulates ice. However, these sensors are typically not installed in the vicinity of critical airfoil surfaces that are susceptible to icing, but instead are typically installed on the fuselage. A camber/geometry of the airfoil can cause ice to form on the leading edge of a wing prior to ice forming on the sensor. Thus, ice detection systems may not be activated in a timely manner under certain conditions.

SUMMARY

In a particular implementation, a method includes receiving a plurality of temperature measurements from temperature sensors of an aircraft. The method includes determining whether a first count of one or more first temperature metrics that are within a temperature range is greater than a first threshold. The one or more temperature metrics are derived from the plurality of temperature measurements. The method includes initiating generating an icing output signal when the first count is greater than or equal to the first threshold.

In another particular implementation, an ice detection system includes a plurality of temperature sensors coupled to an aircraft. The ice detection system includes a controller configured to receive a plurality of temperature measurements from the plurality of temperature sensors. The controller is further configured to determine whether a first count of one or more first temperature metrics that are within a temperature range is greater than a first threshold. The one or more temperature metrics are derived from the plurality of temperature measurements. The controller is further configured to initiate generating an icing output signal when the first count is greater than or equal to the first threshold.

In another particular implementation, a computer-readable storage device stores instructions that, when executed by a processor, cause the processor to perform operations. The operations include receiving a plurality of temperature measurements from temperature sensors of an aircraft. The operations include determining whether a first count of one or more first temperature metrics that are within a temperature range is greater than a first threshold. The one or more first temperature metrics are derived from the plurality of temperature measurements. The operations include initiating generating an icing output signal when the first count is greater than or equal to the first threshold.

The features, functions, and advantages that have been described can be achieved independently in various embodiments or may be combined in yet other embodiments, further details of which are disclosed with reference to the following description and drawings.

DETAILED DESCRIPTION

Particular embodiments of the present disclosure are described below with reference to the drawings. In the description, common features are designated by common reference numbers throughout the drawings.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Figure 1:
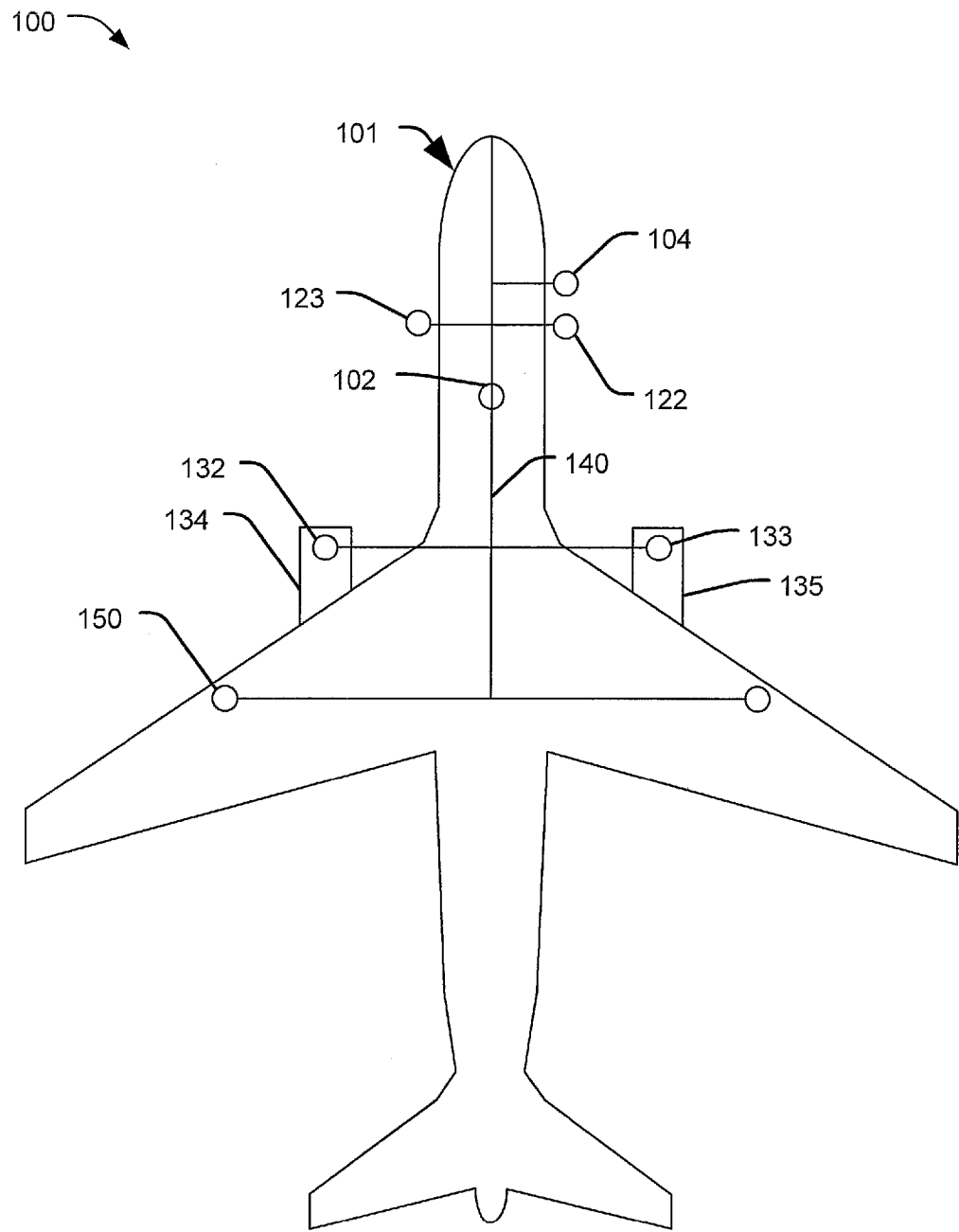
FIG. 1 is a top view of an aircraft that includes an ice detection system.

FIG. 1 illustrates a top view of an aircraft 100 including an ice detection system. The ice detection system includes a plurality of temperature sensors 122, 123, 132, and 133, a controller 102, and a communication system (e.g., a bus) 140. The aircraft 100 may include an airframe 101 and engines 134 and 135.

Figure 2:
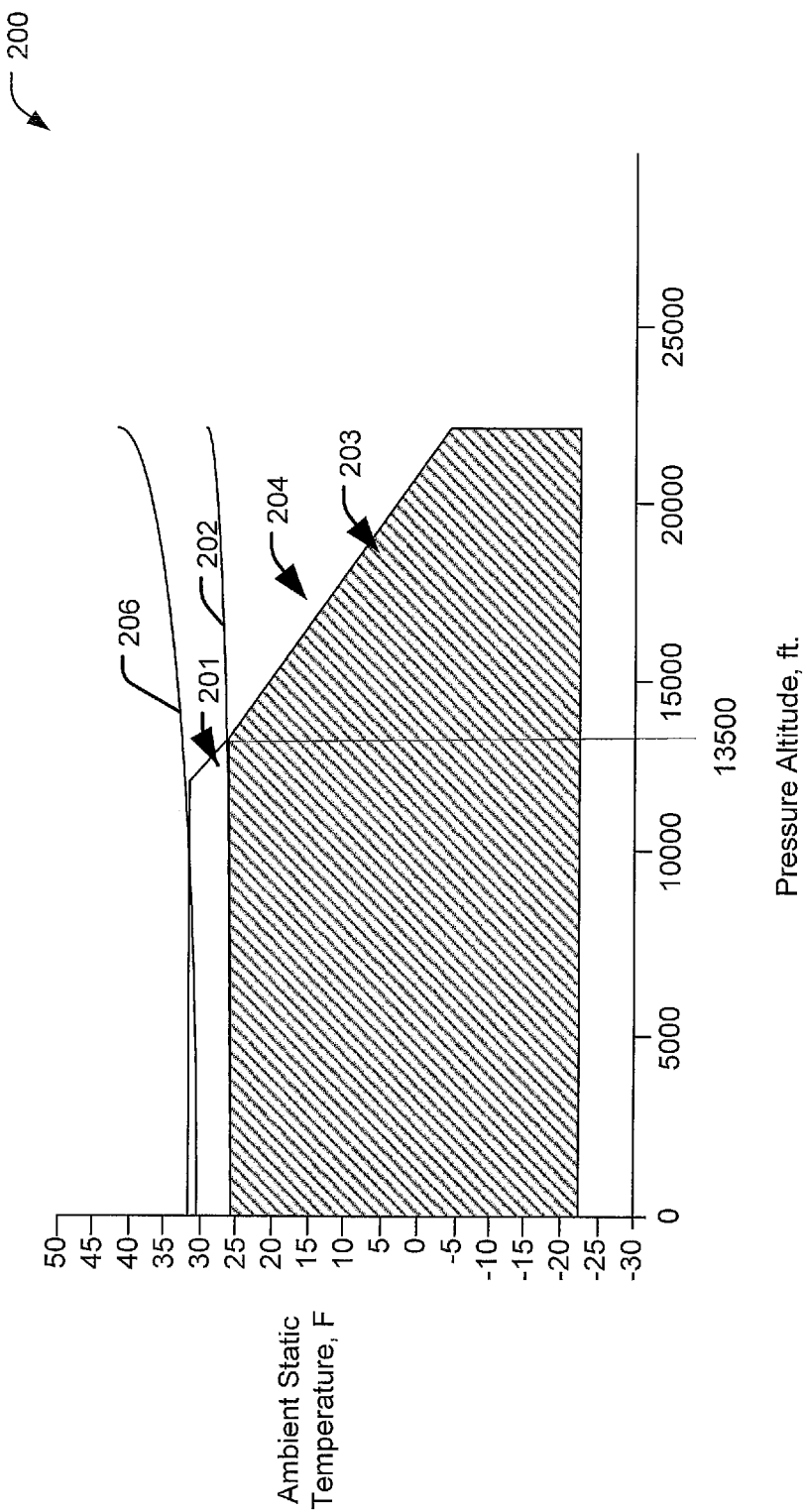
FIG. 2 illustrates an example of an icing envelope associated with the aircraft of FIG. 1 and a zone of non-detection of the icing envelope.

The aircraft 100 may include an ice detector 104 (e.g., an ice accretion detector). The ice detector 104 may be capable of detecting icing conditions in a first zone of an icing envelope associated with the aircraft 100, and may not be capable of detecting icing conditions in a second zone (e.g., a zone of non-detection) of the icing envelope. For example, FIG. 2 illustrates an icing envelope 204 associated with the aircraft 100. In this example, the ice detector 104 may be capable of detecting ice in a first zone 203 of the icing envelope 204 and may not be capable of detecting ice in a second zone (e.g., the zone of non-detection) 201 (e.g., between curves 202 and 206) of the icing envelope 204 associated with the aircraft 100. Thus, ice may form on the aircraft 100 in the second zone without forming on the ice detector 104 (e.g., without the ice detector 104 detecting icing conditions).

The aircraft 100 includes an ice control system 150. The ice control system 150 may include a pneumatic deicing boot, an electro-thermal system, a bleed air system, an electro-mechanical system, or a combination thereof. The ice control system 150 may be activated responsive to an icing output signal from the ice detection system (e.g., from the controller 102). For example, the pneumatic deicing boot may be activated in response to the controller 102 outputting an icing output signal.

The temperature sensors 122 and 123 may correspond to airframe total air temperature (TAT) sensors disposed proximate to different areas of the airframe 101. For example, the temperature sensor 122 may be disposed proximate to a first area of the airframe 101 of the aircraft 100, and the temperature sensor 123 may be disposed proximate to a second area of the airframe 101 of the aircraft 100. The temperature sensors 132 and 133 may correspond to or may include powerplant TAT sensors disposed proximate to (e.g., on, adjacent to, in, under, beside, etc.) different engines of the aircraft 100. For example, the temperature sensor 132 may be disposed proximate to the engine 134 of the aircraft 100, and the temperature sensor 133 may be disposed proximate to the engine 135 of the aircraft 100. Though the figures illustrate airframe and powerplant sensors, other types of temperature sensors may be used. Additionally, the temperature sensors may be disposed, positioned or located differently than as depicted in FIG. 1. Furthermore, a different number of temperature sensors may be used.

Each temperature sensor of the plurality of temperature sensors 122, 123, 132, and 133 may provide at least one temperature measurement. Thus, the plurality of temperature sensors 122, 123, 132, and 133 may collectively provide a plurality of temperature measurements. For example, the temperature sensor 122 may provide a first temperature measurement, the temperature sensor 123 may provide a second temperature measurement, the temperature sensor 132 may provide a third temperature measurement, and the temperature sensor 133 may provide a fourth temperature measurement. In this example, the plurality of temperature measurements may correspond to the first temperature measurement, the second temperature measurement, the third temperature measurement, and the fourth temperature measurement. In some examples, one or more temperature sensors of the plurality of temperature sensors 122, 123, 132, and 133 may include multiple sensor elements such that a single temperature sensor provides multiple temperature measurements. For example, the temperature sensor 122 may include a first sensor element and a second sensor element, and the temperature sensors 123, 132, and 133 may each include a single sensor element. In this example, the first and second sensor elements of the temperature sensor 122 may provide a first temperature measurement and a second temperature measurement, the temperature sensor 123 may provide a third temperature measurement, the temperature sensor 132 may provide a fourth temperature measurement, and the temperature sensor 133 may provide a fifth temperature measurement. In this example, the plurality of temperature measurements may correspond to the first temperature measurement, the second temperature measurement, the third temperature measurement, the fourth temperature measurement, and the fifth temperature measurement. Each of the temperature measurements may include or may correspond to a TAT measurement, and the plurality of temperature measurements may correspond to a plurality of TAT measurements.

In some examples, the communication system 140 includes a bus that communicatively connects the controller 102 to the temperature sensors 122, 123, 132, and 133 or otherwise makes temperature measurements from the temperature sensors 122, 123, 132, and 133 accessible to the controller 102. Alternatively, the communication system 140 may include a wireless transmission system to enable the temperature measurements from the temperature sensors 122, 123, 132, and 133 to be communicated or made accessible to the controller 102.

The controller 102 may include one or more processors coupled to memory. The controller 102 may be configured to read or receive (e.g., via the communication system 140) the plurality of temperature measurements from the plurality of temperature sensors 122, 123, 132, and 133. In some examples, the controller 102 may read or receive the plurality of temperature measurements via the communication system 140.

The controller 102 may be configured to determine whether a first count of one or more first temperature metrics that are within a temperature range is greater than a first threshold. The one or more first temperature metrics may be derived from (e.g., may correspond to or may be determined based on) one or more temperature measurements of the plurality of temperature measurements. The controller 102 may be configured to initiate generating an icing output signal when the first count exceeds the first threshold as described in more detail below.

In some examples, the one or more first temperature metrics may correspond to temperature measurements (e.g., TAT measurements). Alternatively or additionally, the plurality of temperature measurements may correspond to TAT measurements, and the one or more first temperature metrics may correspond to static air temperature (SAT) values determined based on one or more TAT measurements of the plurality of TAT measurements.

In some examples, the one or more first temperature metrics may include (e.g., may only include) validated temperature metrics. As an example, when the one or more first temperature metrics include TAT measurements, the validated temperature metrics may be determined by performing validation of the plurality of TAT measurements. In these examples, the validated temperature metrics may correspond to validated TAT measurements of the plurality of TAT measurements.

Alternatively or additionally, the validated temperature metrics may correspond to SAT values determined from the validated TAT measurements. Alternatively or additionally, the validated temperature metrics may be determined by performing validation of a plurality of SAT values derived from the plurality of TAT measurements. In these examples, the validated temperature metrics may correspond to validated SAT values of the plurality of SAT values. Thus, the one or more first temperature metrics may correspond to the validated temperature metrics (e.g., may correspond to the validated TAT temperature measurements or validated SAT values).

In some examples, the one or more first temperature metrics may be validated by determining whether each of the one or more first temperature metrics is within a particular temperature range (e.g., associated with a temperature sensor). In some examples, the particular temperature range may vary based on altitude. In some examples, the particular temperature range may be determined based on or defined by a manufacturer of the temperature sensor (e.g., defined by calibration performed by the manufacturer).

To illustrate, the controller 102 may be configured to receive the first, second, third, fourth, and fifth temperature measurements from the temperature sensors 122, 123, 132, and 133 as described above. In this example, the temperature sensors 122 and 123 may have a particular temperature range (based on temperature sensor manufacturer data) of −200 degrees Fahrenheit to +200 degrees Fahrenheit, and the temperature sensors 132 and 133 may have a particular temperature range (based on temperature sensor manufacturer data) of −150 degrees Fahrenheit to +150 degrees Fahrenheit.

In this example, the first, second and third temperature measurements may correspond to +35 degrees Fahrenheit, +36 degrees Fahrenheit, and +34 degrees Fahrenheit, respectively. In this example, the controller 102 may determine that the first and second temperature measurements (from the temperature sensor 122) and third temperature measurement (from the temperature sensor 123) are valid temperature measurements because the first, second, and third temperature measurements are within the particular temperature range (e.g., −200 degrees Fahrenheit to +200 degrees Fahrenheit) associated with the respective temperature sensors 122 and 123. Thus, the controller 102 may determine that the first, second, and third temperature metrics are valid (e.g., validated) temperature metrics.

Additionally or alternatively, the fourth and fifth temperature measurements may correspond to −175 and −176, respectively. In this example, the controller 102 may determine that the fourth and fifth temperature measurements are invalid because the fourth and fifth temperature measurements are not within the particular range (e.g., −150 degrees Fahrenheit to +150 degrees Fahrenheit) associated with the respective temperature sensors 132 and 133. Thus, the controller 102 may determine that the fourth and fifth temperature metrics are invalid (e.g., not validated) temperature metrics.

The controller 102 may convert the validated temperature measurements—the first, second, and third temperature measurements—to first, second, and third SAT values, respectively. In this example, the one or more first temperature metrics may correspond to the first, second, and third SAT values. In this example, the controller 102 may be configured to count a number of the first, second, and third SAT values that are within the temperature range to determine the first count of the one or more first metrics within the temperature range. The controller 102 may then compare the first count with the first threshold.

In the above examples, the first count may include temperature metrics from multiple sensor elements of a single temperature sensor. Alternatively, in some examples, the first count may include (may only include) temperature metrics from different sensors. In these examples, the controller 102 may be configured to identify temperature metrics that are from different temperature sensors of the plurality of temperature sensors 122, 123, 132, and 133, and each of the one or more first temperature metrics is from a different temperature sensor of the plurality of temperature sensors 122, 123, 132, and 133.

As an example, when the temperature sensor 122 includes multiple sensor elements as described above, the one or more first temperature metrics may not include both a temperature measurement from a first sensor element of the temperature sensor 122 and a temperature measurement from a second sensor element of the temperature sensor 122 because the first temperature measurement and the second temperature measurement are from different elements of a single sensor (not from different sensors). In these examples, the one or more first temperature metrics may correspond to validated temperature metrics that are derived from different temperature sensors of the temperature sensors 122, 123, 132, and 133. In these examples, the controller 102 may be configured to perform one or more counts to determine a first count of the validated temperature metrics that are from the different temperature sensors and that are within the first temperature range. For example, the controller 102 may be configured to determine a count of temperature metrics within the temperature range for each combination of the validated temperature metrics that include only temperature metrics that are from different temperature sensors. The controller 102 may be configured to determine the "first count" as corresponding to a highest count of the counts for the possible combinations.

To illustrate, the controller 102 may be configured to receive the first, second, third, fourth, and fifth temperature measurements from the temperature sensors 122, 123, 132, and 133. The controller 102 may determine that the first, second, and third temperature measurements (e.g., from the temperature sensors 122 and 123 as described above) are the validated temperature measurements as described above. The controller 102 may convert the first, second, and third temperature measurements to first, second, and third SAT values (e.g., "first, second, and third temperature metrics"), respectively. The controller 102 may determine that the first and second temperature metrics are from a single sensor (e.g., the temperature sensor 122). In this example, the possible combinations that include only validated temperature metrics from different temperature sensors may correspond to the first and third temperature metrics (e.g., a first combination) and to the second and third temperature metrics (e.g., a second combination).

In some examples, the controller 102 may determine that the first and second temperature metrics are within the temperature range, and the controller 102 may determine that the third temperature metric is not within the temperature range. Thus, the first combination may include one (1) temperature metric (e.g., the first temperature metric) that is within the temperature range and the second combination may include one (1) temperature metric (e.g., the second temperature metric) that is within the temperature range. Thus, in this example, the controller 102 may determine a count of temperature metrics of the first combination that are within the temperature range to correspond to one (1) (e.g., the first temperature metric), and may determine a count of temperature metrics of the second combination that are within the temperature range to correspond to one (1) (e.g., the second temperature metric). Thus, a highest count for the possible combinations (e.g., the first combination and the second combination) is one (1). The controller 102 may thus determine that the first count of the one or more validated temperature metrics that are derived from different temperature sensors corresponds to one (1). Therefore, when the first threshold corresponds to two (2), the controller 102 may determine that the first count does not satisfy the first threshold.

Alternatively or additionally, the controller 102 may determine that the first and third temperature metrics are within the temperature range, and the controller 102 may determine that the second temperature metric is not within the temperature range. The controller 102 may determine a count of the temperature metrics of the first combination that are within the temperature range to correspond to two (2), and may determine a count of the temperature metrics of the second combination that are within the temperature range to correspond to one (1). Thus, a highest count for the possible combinations (e.g., the first combination and the second combination) is two (2). The controller 102 may thus determine that the first count of the one or more validated temperature metrics that are from different temperature sensors corresponds to two (2). Therefore, when the first threshold corresponds to two (2), the controller 102 may determine that the first count does satisfy the first threshold.

In some examples, the controller 102 may initiate generation of an icing output signal in response to the first count of the one or more first temperature metrics within the temperature range that are derived from different temperature sensors satisfies the threshold. Using validated temperature measurements from different temperature sensors to detect icing conditions at certain altitudes (e.g., below the threshold described above) may enable the ice detection system of FIG. 1 to detect icing conditions that are not detected by the ice detector 104 (e.g., icing conditions within the zone of non-detection of the icing envelope 204 of FIG. 2).

In some examples, the plurality of temperature sensors 122, 123, 132, and 133 may include different types of sensors. In these examples, the controller 102 may be further configured to determine, responsive to the first count being less than the first threshold, a second count of one or more second temperature metrics that are from a single type of sensor of the different types of sensors and that are within the first temperature range as described in more detail with reference to FIG. 4. To illustrate, the aircraft 100 may include the airframe TAT sensors 122 and 123 (a first type of sensor) and the powerplant TAT sensors 132 and 133 (a second type of sensor). The controller 102 may be configured to perform a second count to determine a number of temperature metrics derived from temperature measurements from the airframe TAT sensors 122 and 123 that are within the temperature range. For example, the temperature sensors 122 and 123 may provide first, second, and third temperature metrics (e.g., the "one or more second temperature metrics that are from a single type of sensor"), and the controller 102 may be configured to determine the second count by counting a number of the first, second, and third temperature metrics that are within the temperature range.

In some examples, the controller 102 is further configured to compare the second count to a second threshold that is different than the first threshold. When the second count is greater than the second threshold, the controller 102 may be configured to determine a difference between the one or more second temperature measurements and a next closest temperature measurement of the plurality of temperature measurements that is from the single type of sensor as described in more detail below with reference to FIG. 4. The controller 102 may be configured to compare the difference to a third threshold.

When the difference is greater than the third threshold, the controller 102 may be configured to initiate generating the icing output signal (or otherwise take action indicative of detecting icing conditions). Using the difference to detect icing conditions may enable the ice detection system of FIG. 1 to detect icing conditions that are not detected by the ice detector 104 (e.g., icing conditions within the zone of non-detection of the icing envelope 204 of FIG. 2).

Figure 3:
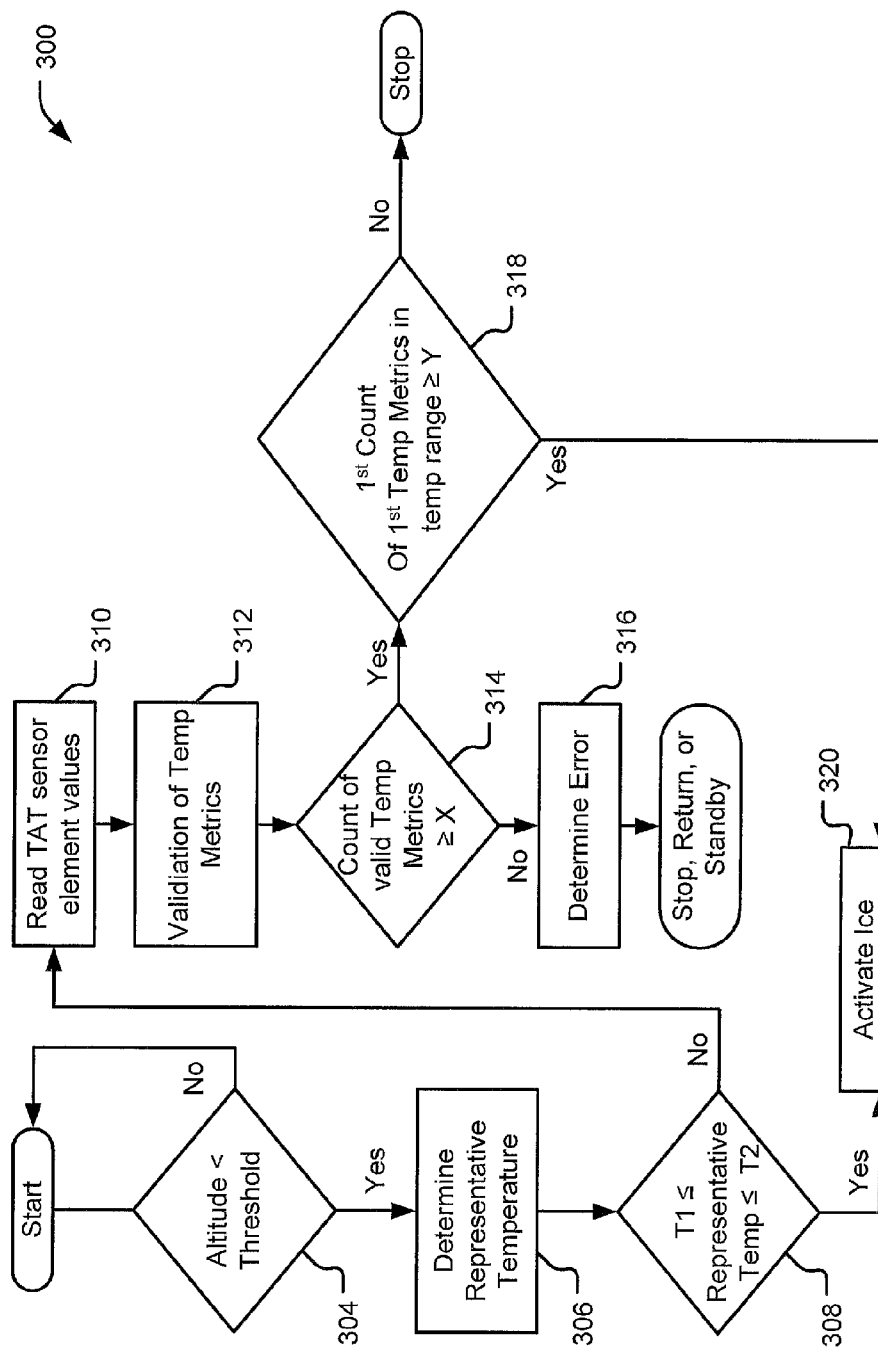
FIG. 3 is a flow chart of a particular example of a method of detecting icing conditions.

FIG. 3 may illustrate a method 300 of detecting icing conditions for an aircraft. The method 300 of FIG. 3 may be performed by the controller 102 of FIG. 1. The method 300 of FIG. 3 may include, at 304, determining whether an altitude of the aircraft 100 of FIG. 1 is less than a threshold. In FIG. 2, ice may form on the aircraft 100 of FIG. 1 at any point within the icing envelope 204 below the curve 206. The ice detector 104 may detect icing conditions below the curve 202 of the icing envelope 204 (e.g., the ice detector 104 may detect icing conditions in the first zone 203 of the icing envelope 204). The ice detector 104 may not detect icing conditions between the curve 202 and the curve 206 (e.g., due to placement of the ice detector 104). This may result in ice forming on the aircraft 100 of FIG. 1 within the zone of non-detection 201 without the ice detector 104 detecting icing conditions (e.g., without ice forming on the ice detector 104). In some examples, ice may form on the aircraft 100 in the zone of non-detection 201 without the ice detector 104 detecting the ice because the ice detector 104 may not be positioned in the immediate vicinity of airfoil surfaces (e.g., is positioned at a forward fuselage area). Different flow characteristics at the leading edge of the airfoils and the forward fuselage area may cause ice to form on the airfoil without forming on the ice detector 104. To detect icing conditions within the zone of non-detection 201, the method 300 may use a threshold that corresponds to a highest altitude of the second zone (e.g., the zone of non-detection) 201 within the icing envelope 204 of FIG. 2. For example, the highest altitude of the zone of non-detection 201 may correspond to 13,500 feet as in FIG. 2.

In some examples, determining, at 304 of FIG. 3, whether the altitude is less than the threshold may be performed by the controller 102 of FIG. 1. For example, the threshold may be stored in memory that is part of, or that is communicatively coupled to, the controller 102, and the controller 102 may be configured to read the threshold from the memory. Additionally or alternatively, the controller 102 may be configured to determine an altitude measurement from one or more instruments of the aircraft 100. The controller 102 may be configured to compare the threshold to the determined altitude measurement to determine whether the aircraft 100 is located below the threshold.

The method 300 of FIG. 3 may include, at 306, when the aircraft 100 of FIG. 1 is determined to be lower than the highest altitude, determining a representative temperature. The representative temperature may be determined by the controller 102 based on one or more temperature measurements from the plurality of temperature sensors 122, 123, 132, and 133 of FIG. 1. In some examples, the representative temperature corresponds to a TAT value. In other examples, the representative temperature corresponds to a SAT value. As an example, the plurality of temperature sensors 122, 123, 132, and 133 of FIG. 1 may provide first, second, third, fourth, and fifth temperature measurements as described above. When the representative temperature corresponds to a TAT value, the representative temperature is determined based on the first, second, third, fourth, and fifth temperature measurements, resulting in a representative TAT temperature. When the representative temperature corresponds to a SAT value, the representative temperature may initially be determined based on TAT measurements, and the representative TAT temperature measurement may converted to a SAT temperature, resulting in a representative SAT temperature.

The representative temperature may be determined based on an average (e.g., mean, median, mode, midrange, etc.) of the temperature measurements from the plurality of temperature sensors 122, 123, 132, and 133. For example, when the plurality of temperature sensors 122, 123, 132, and 133 provide first, second, third, fourth, and fifth temperature measurements, the controller 102 may determine an average of the first, second, third, fourth, and fifth temperature measurements, and the average may correspond to the representative temperature.

Additionally or alternatively, the representative temperature may be determined based on a weighted average of the temperature measurements from the plurality of temperature sensors 122, 123, 132, and 133. In some examples that employ a weighted or biased average, the temperature measurements may be weighted based on an error or accuracy associated with the temperature sensor that is the source of each temperature measurement. As an example, the airframe TAT sensors 122 and 123 may be more accurate than the powerplant TAT sensors 132 and 133. In this example, the temperature measurements from the airframe TAT sensors 122 and 123 may be weighted more than the powerplant TAT sensors 132 and 133, thereby contributing more to the representative temperature than the powerplant TAT sensors 132 and 133. Although the weights applied to the temperature measurements are described herein in an example as being determined based on an accuracy of a sensor, other factors may be used to weight the temperature measurements. Additionally, although average and weighted average are described herein as techniques for determining the representative temperature, other analytical techniques, such as voting techniques or anomaly removal techniques, may be used for determining the representative temperature.

The method 300 of FIG. 3 may include comparing, at 308, the representative temperature to a temperature range indicative of the zone of non-detection. In some examples, the controller 102 of FIG. 1 may be configured to compare the representative temperature to the temperature range. In some examples, the temperature range may be altitude independent. In these examples, the temperature range is constant regardless of the altitude of the aircraft. To illustrate, when the aircraft 100 is associated with the icing envelope 204 illustrated in FIG. 2, the temperature range may correspond to 27 degrees Fahrenheit to 32 degrees Fahrenheit. In other examples, the temperature range may be altitude dependent. In these examples, the temperature range may be determined based on an altitude of the aircraft 100 and the curves 202 and 206 defining the zone. For example, an altitude of 8750 feet may correspond to a temperature range of 27 degrees Fahrenheit to 32 degrees Fahrenheit. As another example, an altitude of 12,500 feet may correspond to a temperature range of 27 degrees Fahrenheit to 33 degrees Fahrenheit.

When the representative temperature is determined to be within the temperature range, the method 300 may include initiating generation of an icing output signal. At 320 of FIG. 3, the icing output signal may be provided to a component that initiates or activates the ice control system 150 of FIG. 1.

When the representative temperature is not determined to be within the temperature range, the method 300 may include reading (e.g., receiving), at 310, a plurality of temperature measurements (e.g., a plurality of TAT measurements) from the plurality of temperature sensors 122, 123, 132, and 133. For example, as described above, the temperature sensor 122 may include a first sensor element and a second sensor element, and the temperature sensors 123, 132, and 133 may each include a single sensor element. In this example, the method 300 may include reading the first and second temperature measurements from the temperature sensor 122, the third temperature measurement from the temperature sensor 123, the fourth temperature measurement from the temperature sensor 132, and the fifth temperature measurement from the temperature sensor 133. Thus, in this example, the plurality of temperature measurements may correspond to five temperature measurements.

The method 300 of FIG. 3 may include, at 312, performing validation on a plurality of temperature metrics to determine validated temperature metrics. In some examples, the plurality of temperature metrics correspond to the plurality of temperature measurements (e.g., the plurality of TAT measurements). Alternatively or additionally, the plurality of temperature measurements may correspond to TAT measurements, and the plurality of temperature metrics may correspond to SAT values determined based on the plurality of TAT measurements. For example, the plurality of temperature sensors 122, 123, 132, and 133 may provide the plurality of TAT measurements to the controller 102, and the controller 102 may convert the plurality of TAT measurements to a plurality of SAT values, which may correspond to the plurality of temperature metrics.

As an example, the controller 102 may perform the validation on the plurality of temperature metrics by performing validation of the plurality of temperature measurements. In these examples, the validated temperature metrics may correspond to TAT measurements (of the plurality of temperature measurements) that have been validated.

Alternatively or additionally, the validated temperature metrics may correspond to SAT values determined from the validated TAT temperature measurements. Alternatively or additionally, the controller 102 may perform the validation of the plurality of temperature metrics by performing validation of the plurality of SAT values. In these examples, the validated temperature metrics may correspond to validated SAT values of the plurality of SAT values.

Validation may be performed based on whether the temperature metric is within a particular temperature range as described above with reference to FIG. 1. For example, as described above, the controller 102 may determine that first, second, and third temperature metrics from the temperature sensors 122 and 123 are valid because the first, second, and third temperature measurements are within the particular temperature range (e.g., −200 degrees Fahrenheit to +200 degrees Fahrenheit) associated with the temperature sensors 122 and 123. In this example, as described above, the controller 102 may determine that fourth and fifth temperature metrics from the temperature sensors 132 and 133 are invalid because the fourth and fifth temperature measurements are not within the particular temperature range (e.g., −150 degrees Fahrenheit to +150 degrees Fahrenheit) associated with the temperature sensors 132 and 133 as described above.

The method 300 may include, at 314, determining whether a count of the validated temperature metrics satisfies a threshold by counting the validated temperature metrics to determine a number of the validated temperature metrics and comparing the number of the validated temperature metrics to the threshold. In some examples, the threshold may correspond to two (2). When the preliminary count of the validated temperature metrics does not satisfy the threshold, the method may determine at 316 that the plurality of TAT measurements are erroneous and the method 300 may terminate.

The method 300 may include, at 318, determining responsive to (e.g., when) the number of the validated temperature metrics satisfying the threshold, whether a first count of one or more first temperature metrics (of the plurality of temperature metrics) that are within the first temperature range is greater than a first threshold. In some examples, the one or more first temperature metrics may correspond to validated temperature metrics that are from different temperature sensors. In these examples, the controller 102 may be configured to count the validated temperature metrics that are from the different temperature sensors and that are within the first temperature range to determine the first count. The controller 102 may be configured to compare the first count to a threshold to determine whether the first count is greater than the threshold. The controller 102 may be configured to generate an icing output signal when the first count is greater than the threshold.

Thus, the method 300 of FIG. 3 may detect icing and activate an ice control system even when a representative temperature from the temperature sensors 122, 123, 132, and 133 of FIG. 1 does not indicate that the aircraft 100 is at a temperature within the icing envelope 204 of FIG. 2 of the aircraft 100 of FIG. 1. This may enable the method 300 of FIG. 3 to detect aircraft icing in real time at temperatures and conditions within the zone of non-detection of FIG. 2. The method 300 in conjunction with the ice detector 104 of FIG. 1 may detect aircraft icing in real time at all temperatures and conditions within the icing envelope 204 of FIG. 2.

Figure 4:
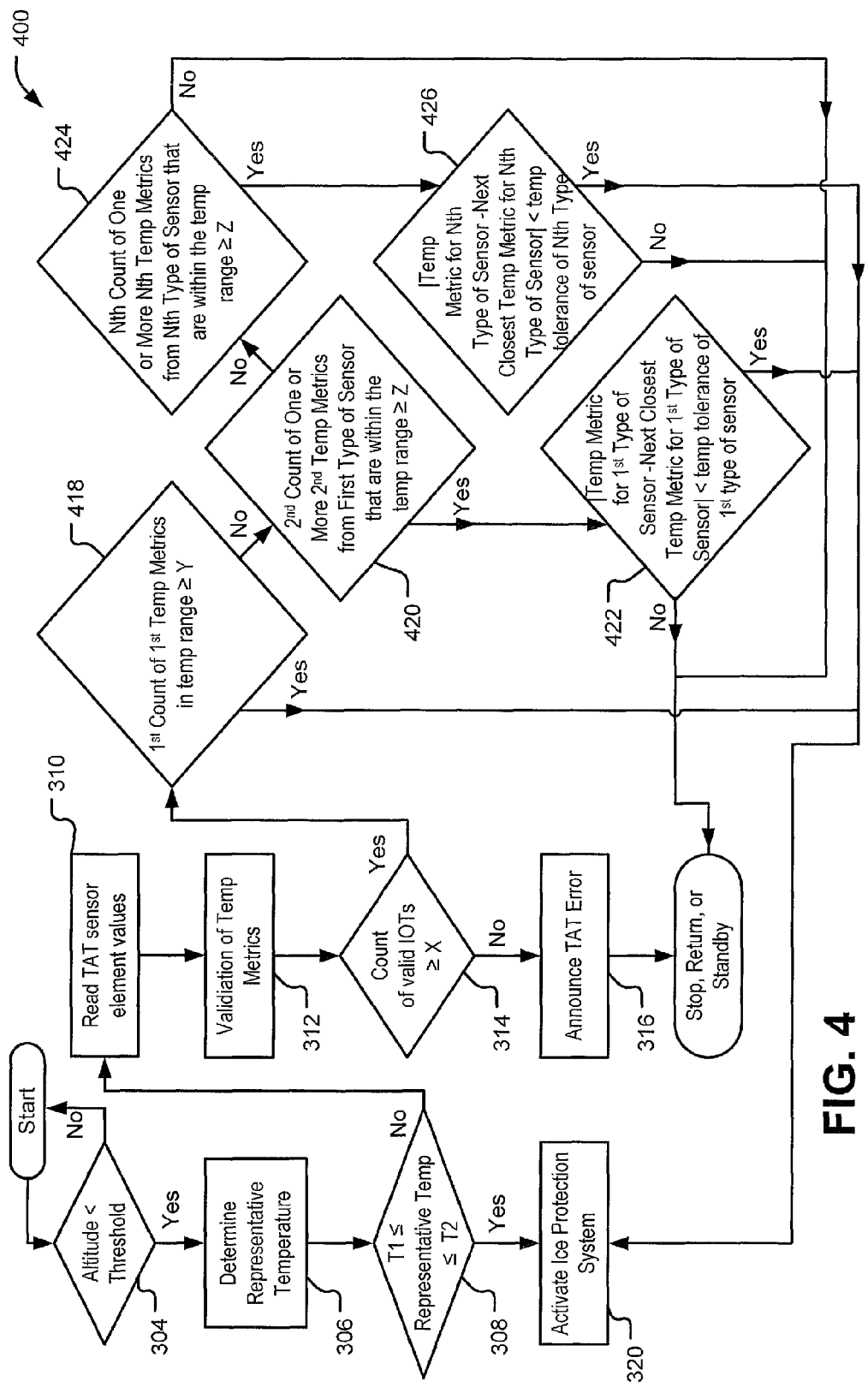
FIG. 4 is a flow chart of a particular example of a method of detecting icing conditions.

FIG. 4 may illustrate a method of detecting icing conditions for an aircraft. The method 400 of FIG. 4 may be performed by the controller 102 of FIG. 1. The method 400 of FIG. 4 may include 304, 306, 308, 310, 312, 314, and 316 as described above with reference to FIG. 3. At 418 of FIG. 4, if the first count of the one or more first temperature metrics is not greater than the threshold (as described above with reference to 318 of FIG. 3), the method proceeds to 420.

At 420, the method includes determining whether a second count of one or more second temperature metrics of a second plurality of temperature metrics from temperature sensors of a first type (e.g., the "one or more second temperature metrics") that are within the temperature range (e.g., the "one or more second temperature metrics within the temperature range") are greater than or equal to a second threshold. For example, the aircraft 100 of FIG. 1 may include multiple types (e.g., N types) of temperature sensors. The second threshold may be different than the first threshold described with reference to 318. When the second count of the one or more second temperature metrics within the temperature range is greater than or equal to the second threshold, the method may proceed to decision 422. Alternatively, when the second count of the one or more second temperature metrics within the temperature range is not greater than or equal to the second threshold, and one or more types of the N types of sensors have not yet been analyzed, the method may proceed to 424. Alternatively, when the second count of one or more second temperature metrics within the temperature range is not greater than or equal to the second threshold, and all types of the N types of sensors have been analyzed, the method 400 may terminate.

To illustrate, the first type of sensor may correspond to the airframe TAT sensor type and the second threshold may correspond to one (1). Thus, the sensors of the first type may correspond to the temperature sensor 122 and the temperature sensor 123. In this example, the number of the N types of sensors may correspond to two (2)—the airframe TAT sensor type and the engine TAT sensor type. In this example, the second plurality of temperature metrics may correspond to the first temperature measurement (or a first SAT value determined therefrom), the second temperature measurement (or a second SAT value determined therefrom), and the third temperature measurement (or a third SAT value determined therefrom) described above. In this example, the controller 102 may be configured to determine the second count by counting a number of the first temperature measurement (or a first SAT value determined therefrom), the second temperature measurement (or a second SAT value determined therefrom), and the third temperature measurement (or a third SAT value determined therefrom) that are within the temperature range.

As an example, the controller 102 may determine that the first SAT value is within the temperature range while the second and third SAT values are not. In this example, the controller 102 may thus determine that the one or more second temperature metrics corresponds to the first SAT value, and thus may determine that the second count corresponds to one (1). In this example, because the second threshold corresponds to one (1), the controller 102 may determine that the second count of the one or more second temperature metrics satisfies (e.g., is greater than or equal to) the second threshold, and the method may thus proceed to 422.

Alternatively, the controller 102 may determine that neither the first temperature measurement (or the first SAT value determined therefrom), the second temperature measurement (or a second SAT value determined therefrom), nor the third temperature measurement (or a third SAT value determined therefrom) are within the temperature range. In this example, the controller 102 may thus determine that the second count corresponds to zero (0) and does not satisfy (e.g., is greater than or equal to) the second threshold (e.g., 1). In this example, because only the first of the two types of sensors have been analyzed, the method may proceed to 424 to analyze one or more third temperature metrics for a sensor of a second type.

At 422, the method determines whether a difference between the one or more second temperature metrics within the temperature range and a next closest temperature metric of the second plurality of temperature metrics from the sensors of the first type. To illustrate using the example above in which the first temperature measurement (or the first SAT value determined therefrom) is within the temperature range, the third temperature measurement (or the third SAT value determined therefrom) may be determined to be the closest (to the first temperature measurement or the first SAT value determined therefrom) temperature metric of the plurality of second temperature metrics (e.g., of the second temperature measurement or the second SAT value and the third temperature measurement or the third SAT value). In this example, the controller 102 may determine a difference between the first temperature measurement (or the first SAT value determined therefrom) and the third temperature measurement (or the third SAT value determined therefrom), and may compare the difference to a temperature tolerance or error associated with the first type of sensor (e.g., error associated with the airframe TAT sensors). The temperature tolerance or error associated with the first type of sensor may be stored in memory and read by the controller 102. The controller 102 may generate the icing control signal responsive to determining that the difference between the one or more second temperature metrics (of the second plurality of temperature metrics from the first sensors) that are within the temperature range and a next closest temperature metric of the second plurality of temperature metrics from the first sensors is less than the temperature tolerance or error associated with the first sensors. Alternatively, because only one of the N (e.g., two) types of sensors have been analyzed, the method may proceed to 424 responsive to determining that the difference between the one or more second temperature metrics within the temperature range and a next closest temperature metric of the second plurality of temperature metrics is not less than the temperature tolerance or error associated with the first type of sensor.

At 424, the method 400 includes determining whether a third count of one or more third temperature metrics of a third plurality of temperature metrics from temperatures sensors of a second type (e.g., the "one or more third temperature metrics") that are within the temperature range (e.g., the "one or more third temperature metrics within the temperature range") are greater than or equal to a third threshold. The third threshold may be different than the second threshold. In the example described above in which two types of sensors (airframe TAT sensor type and powerplant TAT sensor type) are included (e.g., when N=2), 424 of FIG. 4 may include determining whether a count of one or more third temperature metrics from the powerplant TAT sensors that are within the temperature range is greater than a third threshold. The third threshold may be different than the second threshold. When the third count of one or more third temperature metrics that are within the temperature range are greater than or equal to the third threshold, the method may proceed to decision 426. Alternatively, because there are only two types of sensors, when the third count of the one or more third temperature metrics that are within the temperature range is not greater than or equal to the third threshold, the method may terminate.

To illustrate, the second type of temperature sensor may correspond to powerplant TAT sensors and the third plurality of third temperature metrics may thus correspond to a fourth temperature metric from the temperature sensor 132 and to a fifth temperature metric from the temperature sensor 133. In this example, the third threshold may correspond to one (1). The controller 102 may determine that the fourth temperature measurement (or a fourth SAT value determined therefrom) is within the temperature range, and may determine that the fifth temperature measurement (or a fifth SAT value determined therefrom) is not within the temperature range. In this example, the one or more third temperature metrics within the temperature range may thus correspond to the fourth temperature measurement (or the fourth SAT value determined therefrom), and the third count may correspond to one (1). In this example, because the third threshold corresponds to one (1), the controller 102 may determine that the third count of the one or more third temperature metrics satisfy the third threshold, and may thus proceed to 426.

At 426, the method determines whether a difference between the one or more third temperature metrics within the temperature range and a next closest temperature metric of the third plurality of temperature metrics. To illustrate using the example above in which the fourth temperature measurement (or the fourth SAT value determined therefrom) is within the temperature range, the fifth temperature measurement (or the fifth SAT value determined therefrom) may be determined to be the closest (to the fourth temperature measurement or the fourth SAT value determined therefrom) temperature metric of the third plurality of temperature metrics. In this example, the controller 102 may determine a difference between the fourth temperature measurement (or the fourth SAT value determined therefrom) and the fifth temperature measurement (or the fifth SAT value determined therefrom) and may compare the difference to a temperature tolerance or error associated with the second type of sensor (e.g., an error associated with the engine TAT sensors). The temperature tolerance or error associated with the second type of sensor may be stored in memory and read by the controller. The controller 102 may generate the icing control signal responsive to determining that the difference between the one or more third temperature metrics of the third plurality of temperature metrics from the second sensors that are within the temperature range and a next closest temperature metric of the third plurality of temperature metrics from the second sensors is less than the temperature tolerance or error associated with the second type of sensor. Alternatively, because all of the N (e.g., two) types of sensors have been analyzed, the method may terminate responsive to determining that the difference between the one or more third temperature metrics within the temperature range and a next closest indicator of temperature of the plurality of third temperature metrics from the second sensors is not less than the temperature tolerance or error associated with the second type of sensor.

Thus, the method 400 of FIG. 4 may activate an ice control system when a representative temperature from the temperature sensors 122, 123, 132, and 133 of FIG. 1 does not indicate that the aircraft is at a temperature within the icing envelope 204 of FIG. 2 of the aircraft 100 of FIG. 1. This may enable the method 400 of FIG. 4 to detect aircraft icing in real time at temperatures and conditions within the zone of non-detection of FIG. 2. The method 400 in conjunction with the ice detector 104 of FIG. 1 may detect aircraft icing in real time at all temperatures and conditions within the icing envelope 204 of FIG. 2.

Figure 5:
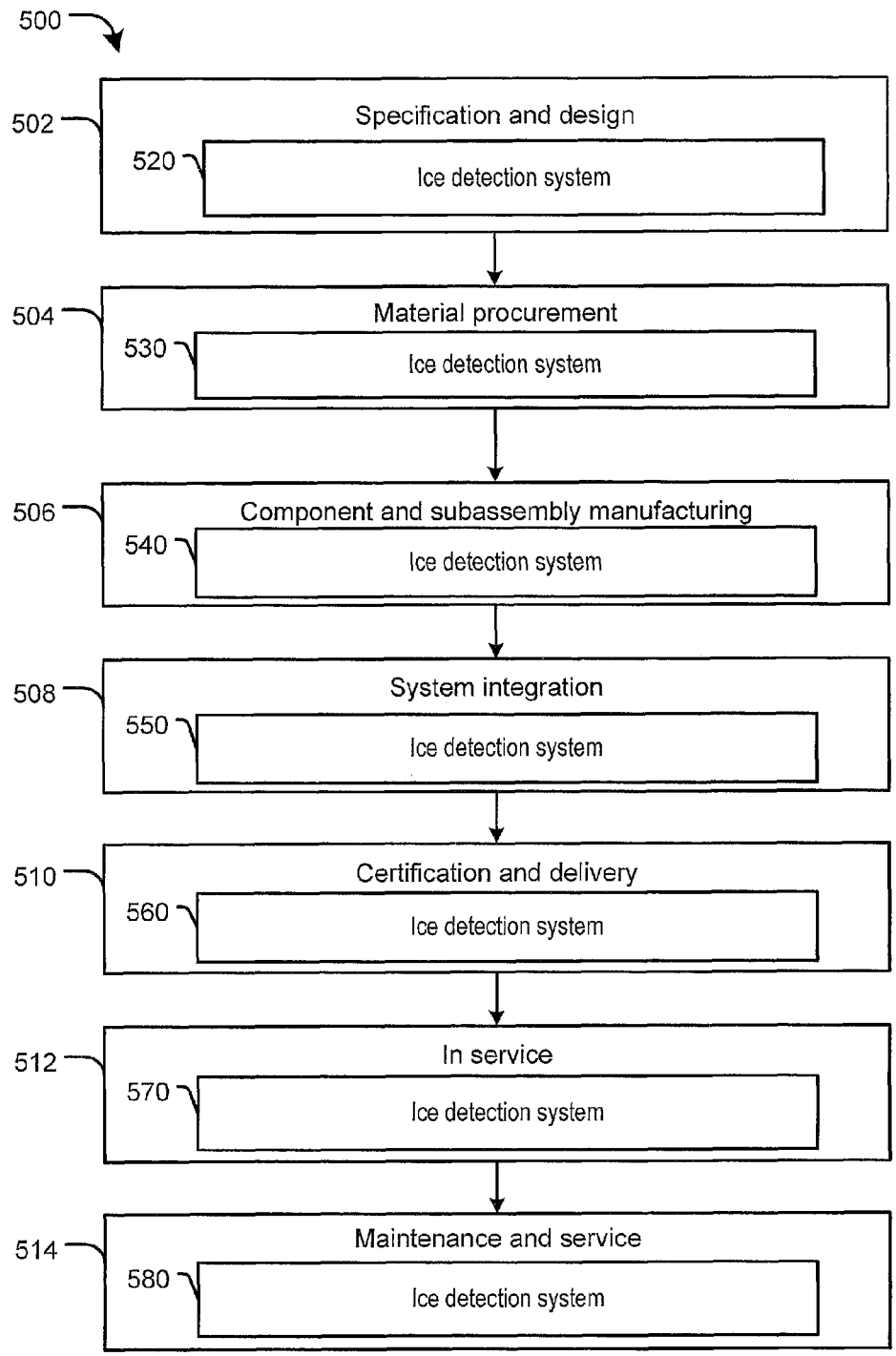
FIG. 5 is a flow chart illustrative of a life cycle of an aircraft that includes an example of an ice detection system.

Referring to FIG. 5, a flowchart illustrative of a life cycle of a vehicle including an ice detection system including a plurality of temperature sensors and a controller configured to selectively generate an icing control signal is shown and designated 500. During pre-production, the exemplary method 500 includes, at 502, specification and design of an aircraft, such as the aircraft 100 of FIG. 1 or 602 described with reference to FIG. 6. During specification and design of the aircraft, the method 500 may include, at 520, specification and design of an ice detection system configured to selectively generate the icing control signal. The ice detection system may include or may correspond to the controller 102 of FIG. 1, the sensors 122, 123, 132, and 133, and the communication system 140. At 504, the method 500 includes material procurement. At 530, the method 500 includes procuring materials (such as the sensors) for the ice detection system.

During production, the method 500 includes, at 506, component and subassembly manufacturing and, at 508, system integration of the aircraft. The method 500 may include, at 540, component and subassembly manufacturing (e.g., producing the controller 102, the sensors 122, 123, 132, and/or 133, or the communication system 140) of the flight management system and, at 550, system integration (e.g., coupling the controller 102 to the communication system 140) of the ice detection system. At 510, the method 500 includes certification and delivery of the aircraft and, at 512, placing the aircraft in service. Certification and delivery may include, at 560, certifying the ice detection system. At 570, the method 500 includes placing the ice detection system in service. While in service by a customer, the aircraft may be scheduled for routine maintenance and service (which may also include modification, reconfiguration, refurbishment, and so on). At 514, the method 500 includes performing maintenance and service on the aircraft. At 580, the method 500 includes performing maintenance and service of the ice detection system. For example, maintenance and service of the ice detection system may include replacing one or more of the controller 102, the communication system 140, the temperature sensors 122, 123, 132, and/or 133, or a combination thereof.

Each of the processes of the method 500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Figure 6:
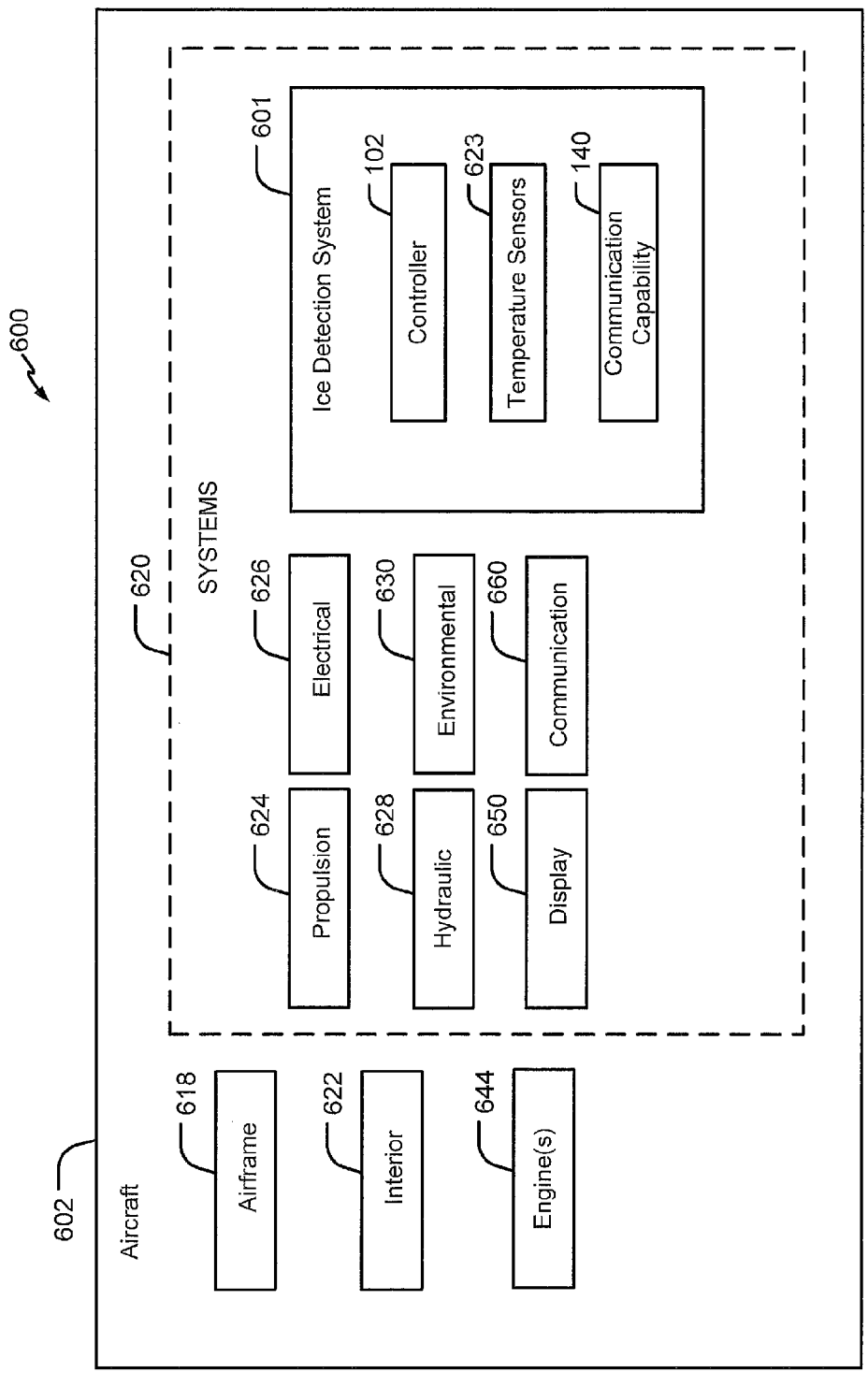
FIG. 6 is a block diagram of an illustrative embodiment of an aircraft that includes a flight management system configured to determine an adjusted speed based on an RTA and an RTA index value.

Referring to FIG. 6, a block diagram of an illustrative embodiment of an aircraft that includes a flight management system configured to detect ice within a zone of non-detection (described above) is shown and designated 600. As shown in FIG. 6, the aircraft 602 produced by the method 500 may include an airframe 618, an interior 622, one or more engines 644, and a plurality of systems 620 including an ice detection system 601. The systems 620 may additionally include one or more of a propulsion system 624, an electrical system 626, a hydraulic system 628, an environmental system 630, a display system 650, and a communication system 660. The ice detection system 601 may include or may correspond to the ice detection system described with reference to FIG. 1, and may include the controller 102, temperature sensors 623 (e.g., including the temperature sensors 122, 123, 132, and 133), and the communication system 140. Any number of other systems may be included. Although an aerospace example is shown, the embodiments described herein may be applied to other industries, such as the automotive industry.

Apparatus and methods embodied herein may be employed during any one or more of the stages of the method 500. For example, components or subassemblies corresponding to production process 508 may be fabricated or manufactured in a manner similar to components or subassemblies produced while the aircraft 602 is in service, at 512 for example and without limitation. Also, one or more apparatus embodiments, method embodiments, or a combination thereof may be utilized during the production stages (e.g., elements 502-510 of the method 500), for example, by substantially expediting assembly of or reducing the cost of the aircraft 602. Similarly, one or more of apparatus embodiments, method embodiments, or a combination thereof may be utilized while the aircraft 602 is in service, at 512 for example and without limitation, to maintenance and service, at 514.

The illustrations of the examples described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than shown in the figures or one or more method steps may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. As the following claims reflect, the claimed subject matter may be directed to less than all of the features of any of the disclosed examples.

Examples described above illustrate but do not limit the disclosure. It should also be understood that numerous modifications and variations are possible in accordance with the principles of the present disclosure. Accordingly, the scope of the disclosure is defined by the following claims and their equivalents.

What is claimed is:

1. A method comprising:
receiving a plurality of temperature measurements from a plurality of temperature sensors coupled to an aircraft;
determining first temperature metrics based on the plurality of temperature measurements;
counting a number of the first temperature metrics that are within a specified temperature range to establish a first count of the first temperature metrics;
determining whether the first count is greater than a first threshold count value; and
when the first count is greater than or equal to the first threshold count value, initiating generation of an icing output signal to activate an ice control system of the aircraft.

2. The method of claim 1, wherein the plurality of temperature measurements correspond to a plurality of total air temperature (TAT) measurements, and wherein the one or more first temperature metrics correspond to validated static air temperature (SAT) values derived from validated TAT measurements.

3. The method of claim 1, further comprising validating the first temperature metrics by determining that each temperature metric of the first temperature metrics is within a particular temperature range, the particular temperature range associated with a particular type of temperature sensors of the plurality of temperature sensors, wherein the first temperature metrics correspond to validated temperature metrics derived from different temperature sensors of the plurality of temperature sensors.

4. The method of claim 3, further comprising determining, responsive to the first count being less than the first threshold count value, a second count of second temperature metrics that are from a first type of temperature sensor and that are within the specified temperature range, wherein the particular type of temperature sensor is distinct from at least one other type of temperature sensors based on manufacturing data.

5. The method of claim 4, further comprising comparing the second count to a second threshold count value different than the first threshold count value.

6. The method of claim 5, further comprising, when the second count is greater than the second threshold count value, determining a difference between a second temperature metric and a next closest temperature metric that is from the first type of temperature sensor.

7. The method of claim 6, further comprising determining whether the difference is less than a temperature tolerance of the first type of temperature sensor.

8. The method of claim 7, wherein the icing output signal is generated when the difference is less than the temperature tolerance.

9. The method of claim 3, further comprising counting the validated temperature metrics to determine a number of the validated temperature metrics.

10. The method of claim 9, wherein determining whether the first count is greater than or equal to the first threshold count value is performed when the number of the validated temperature metrics satisfies a second threshold count value.

11. An ice detection system comprising:
a plurality of temperature sensors coupled to an aircraft; and
a controller configured to:
receive a plurality of temperature measurements from the plurality of temperature sensors;
determine first temperature metrics based on the plurality of temperature measurements;
count a number of the first temperature metrics that are within a specified temperature range to establish a first count of the first temperature metrics;
determine whether the first count is greater than a first threshold count value; and
when the first count is greater than or equal to the first threshold count value, initiate generation of an icing output signal to activate an ice control system of the aircraft.

12. The ice detection system of claim 11, wherein the plurality of temperature measurements correspond to a plurality of total air temperature (TAT) measurements, and wherein the first temperature metrics correspond to validated static air temperature (SAT) values derived from validated TAT measurements.

13. The ice detection system of claim 11, wherein the controller is further configured to identify temperature metrics from different temperature sensors of the plurality of temperature sensors, and wherein each temperature metric of the first temperature metrics is from a different temperature sensor of the plurality of temperature sensors.

14. The ice detection system of claim 11, wherein the plurality of temperature sensors comprise different types of sensors, and wherein the controller is further configured to determine, responsive to the first count being less than the first threshold count value, a second count of second temperature metrics that are from a first type of temperature sensor and that are within the specified temperature range.

15. The ice detection system of claim 14, wherein the controller is further configured to:
compare the second count to a second threshold count value that is different than the first threshold count value; and
when the second count is greater than the second threshold count value, determine a difference between a second temperature metric and a next closest temperature metric that is from a first type of sensor.

16. A computer-readable non-transitory storage device storing instructions that, when executed by a processor, cause the processor to perform operations comprising:
receiving a plurality of temperature measurements from a plurality of temperature sensors coupled to an aircraft;
determining first temperature metrics based on the plurality of temperature measurements;
counting a number of the first temperature metrics that are within a specified temperature range to establish a first count of the first temperature metrics;
determining whether the first count is greater than a first threshold count value; and
when the first count is greater than or equal to the first threshold count value, initiating generation of an icing output signal to activate an ice control system of the aircraft.

17. The computer-readable storage device of claim 16, wherein the plurality of temperature measurements correspond to a plurality of total air temperature (TAT) measurements, and wherein the first temperature metrics correspond to validated static air temperature (SAT) values derived from validated TAT measurements.

18. The computer-readable storage device of claim 16, wherein the first temperature metrics correspond to validated temperature metrics derived from different temperature sensors of the plurality of temperature sensors.

19. The computer-readable storage device of claim 18, wherein the operations further comprise determining, responsive to the first count being less than the first threshold count value, a second count of second temperature metrics within the specified temperature range, the second temperature metrics derived from a first type of temperature sensor.

20. The computer-readable storage device of claim 19, wherein the operations further comprise comparing the second count to a second threshold count value different than the first threshold count value.

* * * * *